US009785549B2

(12) United States Patent
Hillberg et al.

(10) Patent No.: US 9,785,549 B2
(45) Date of Patent: Oct. 10, 2017

(54) MANAGING OBJECT LIFETIME FOR NATIVE/MANAGED PEERS

(75) Inventors: Michael J. Hillberg, Beaux Arts, WA (US); Ashraf A. Michail, Redmond, WA (US); Sujal S. Parikh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 867 days.

(21) Appl. No.: 11/741,549

(22) Filed: Apr. 27, 2007

(65) Prior Publication Data

US 2008/0270482 A1 Oct. 30, 2008

(51) Int. Cl.
  *G06F 7/00* (2006.01)
  *G06F 12/02* (2006.01)
(52) U.S. Cl.
  CPC ...... *G06F 12/0261* (2013.01); *G06F 12/0253* (2013.01); *G06F 12/0276* (2013.01); *G06F 2212/1032* (2013.01); *G06F 2212/1044* (2013.01)
(58) Field of Classification Search
  CPC .................................................. G06F 12/0276
  USPC ............................. 707/104.1, 100, 10, 3, 814
  See application file for complete search history.

(56) References Cited

U.S. PATENT DOCUMENTS

| | | | |
|---|---|---|---|
| 5,274,804 A * | 12/1993 | Jackson et al. | |
| 5,398,334 A | 3/1995 | Topka et al. | |
| 5,765,174 A | 6/1998 | Bishop | |
| 5,873,105 A | 2/1999 | Tremblay et al. | |
| 5,918,235 A * | 6/1999 | Kirshenbaum et al. | |
| 6,105,041 A | 8/2000 | Bennett et al. | |
| 6,349,343 B1 | 2/2002 | Foody et al. | |
| 6,473,773 B1 * | 10/2002 | Cheng et al. | 707/200 |
| 6,654,773 B2 | 11/2003 | Hills | |

(Continued)

FOREIGN PATENT DOCUMENTS

| | | |
|---|---|---|
| EP | 0940755 A1 | 9/1999 |
| JP | H07507887 A | 8/1995 |
| WO | WO 2007/019220 A2 | 2/2007 |

OTHER PUBLICATIONS

International Search Report and Written Opinion for PCT Application Serial. No. PCT/US2008/058213, mailed Aug. 14, 2008, 4 pages.

(Continued)

*Primary Examiner* — Mark D Featherstone
*Assistant Examiner* — Eliyah S Harper
(74) *Attorney, Agent, or Firm* — Fiala & Weaver P.L.L.C.

(57) ABSTRACT

A system that manages lifetime of an object is provided. The system analyzes references on multiple objects to determine reachability of a native peer and dynamically transitions between native and managed object lifetime management systems based on the analysis. When a native peer is not reachable by a native application reference, the system weakens references to a managed peer avoiding memory leaks and clones the native references to the managed side to avoid premature collection. The system performs an optimized cleanup during object system shutdown wherein the references between managed and native peers are released and SafeHandles are suppressed from finalization. The system employs a pending remove list that stores a reference to a weak reference of a managed peer to eliminate race conditions that occur during finalization.

20 Claims, 16 Drawing Sheets

(56) References Cited

U.S. PATENT DOCUMENTS

| | | | |
|---|---|---|---|
| 6,681,263 B1* | 1/2004 | King | G06F 9/4435 707/999.202 |
| 6,728,738 B2 | 4/2004 | Wolczko et al. | |
| 6,865,657 B1 | 3/2005 | Traversat et al. | |
| 7,072,905 B2 | 7/2006 | Garthwaite | |
| 7,519,640 B1* | 4/2009 | Garthwaite | G06F 12/0261 |
| 2004/0098731 A1 | 5/2004 | Demsey et al. | |
| 2004/0111451 A1* | 6/2004 | Garthwaite | G06F 12/0276 |
| 2007/0022268 A1 | 1/2007 | Stephens | |
| 2007/0203960 A1* | 8/2007 | Guo | 707/206 |

OTHER PUBLICATIONS

Notice of Allowance received in Japan Patent Application No. 2010-506370, Mail Date: Dec. 3, 2013, File Date: Mar. 26, 2008, 3 Pages. (w/o English Translation).

Harris, Dynamic adaptive pre-tenuring, http://delivery.acm.org/10.1145/370000/362476/p127-harris.pdf?key1=362476&key2=2284786711&coll=GUIDE&dl=GUIDE&CFID=16727981&CFTOKEN=40572518, 10 pages, Sun Microsystems Laboratories One Network Drive Burlington, MA 01803-0902.

Wilson, et al., A "Card-Marking" Scheme for Controlling Intergenerational References in Generation-Based Garbage Collection on Stock Hardware http://delivery.acm.org/10.1145/70000/66077/p87-wilsonpdfkey1=66077&key2=7905786711&coll=GUIDE&dl=GUIDE&CFID=16728249&CFTOKEN=43532712, 6 pages, Electrical Engineering and Computer Science Dept. University of Illinois at Chicago,Chicago, Illinois 606A.

Blackburn, et al., Ulterior Reference Counting: Fast Garbage Collection without a Long Wait, http://delivery.acm.org/10.1145/950000/949336/p344-blackburn.pdf?key1=949336&key2=0856786711&coll=GUIDE&dl=GUIDE&CFID=16729587&CFTOKEN=12939744, 15 pages OOPSLA'03, Oct. 26-30, 2003, Anaheim, California.

"Office Action Issued in Indian Patent Application No. 05702/CHENP/2009", dated Jul. 13, 2017, 7 pages.

* cited by examiner

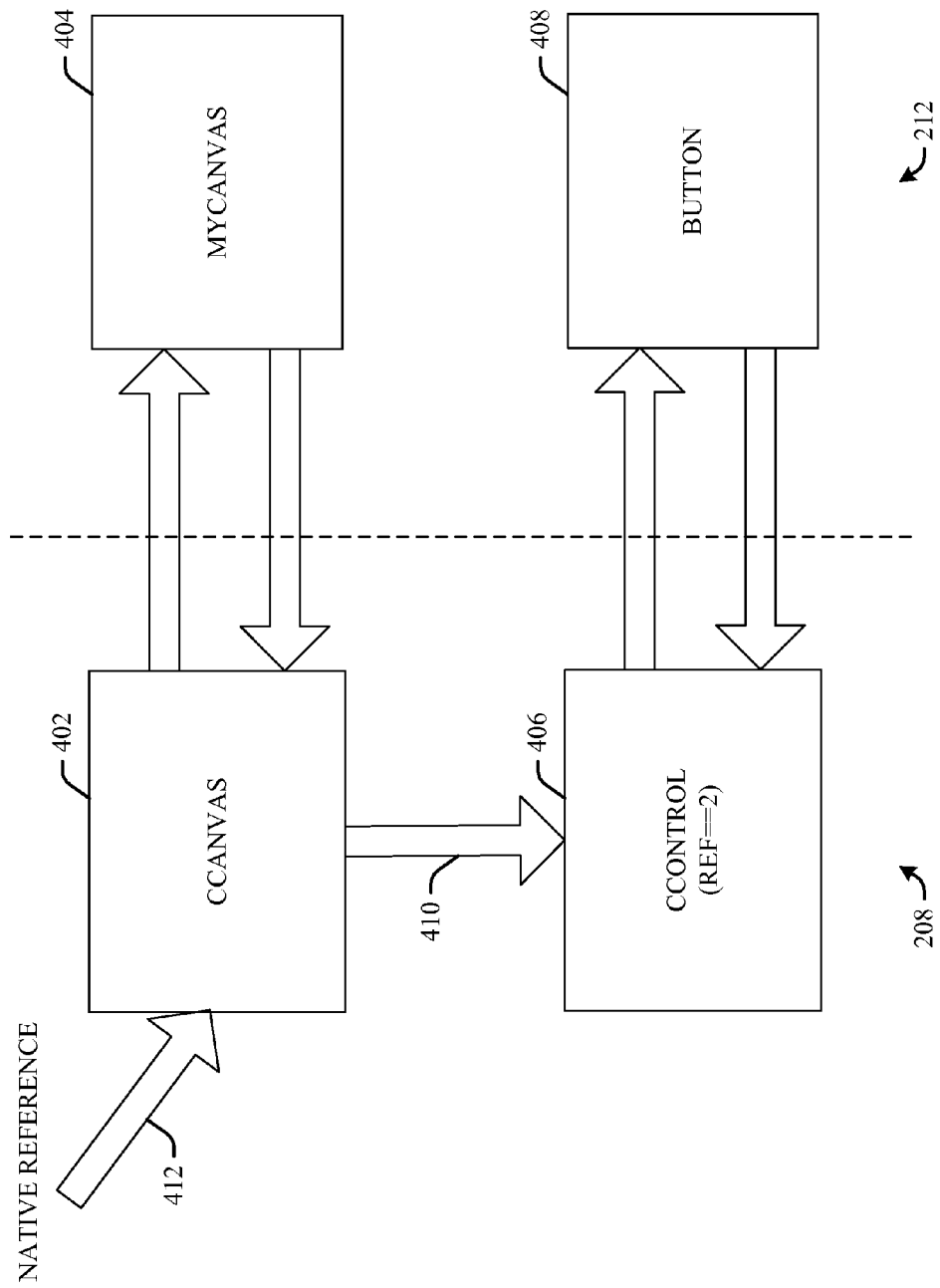

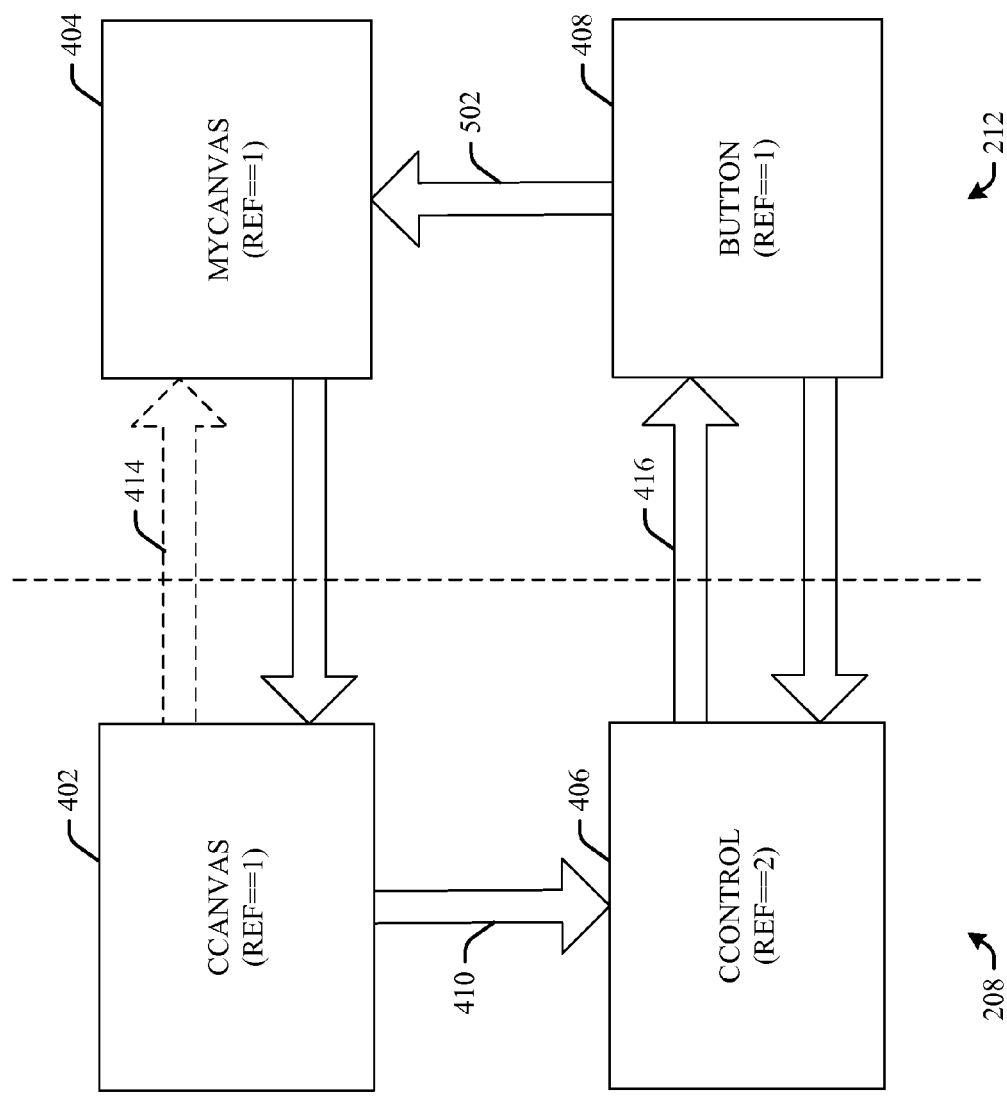

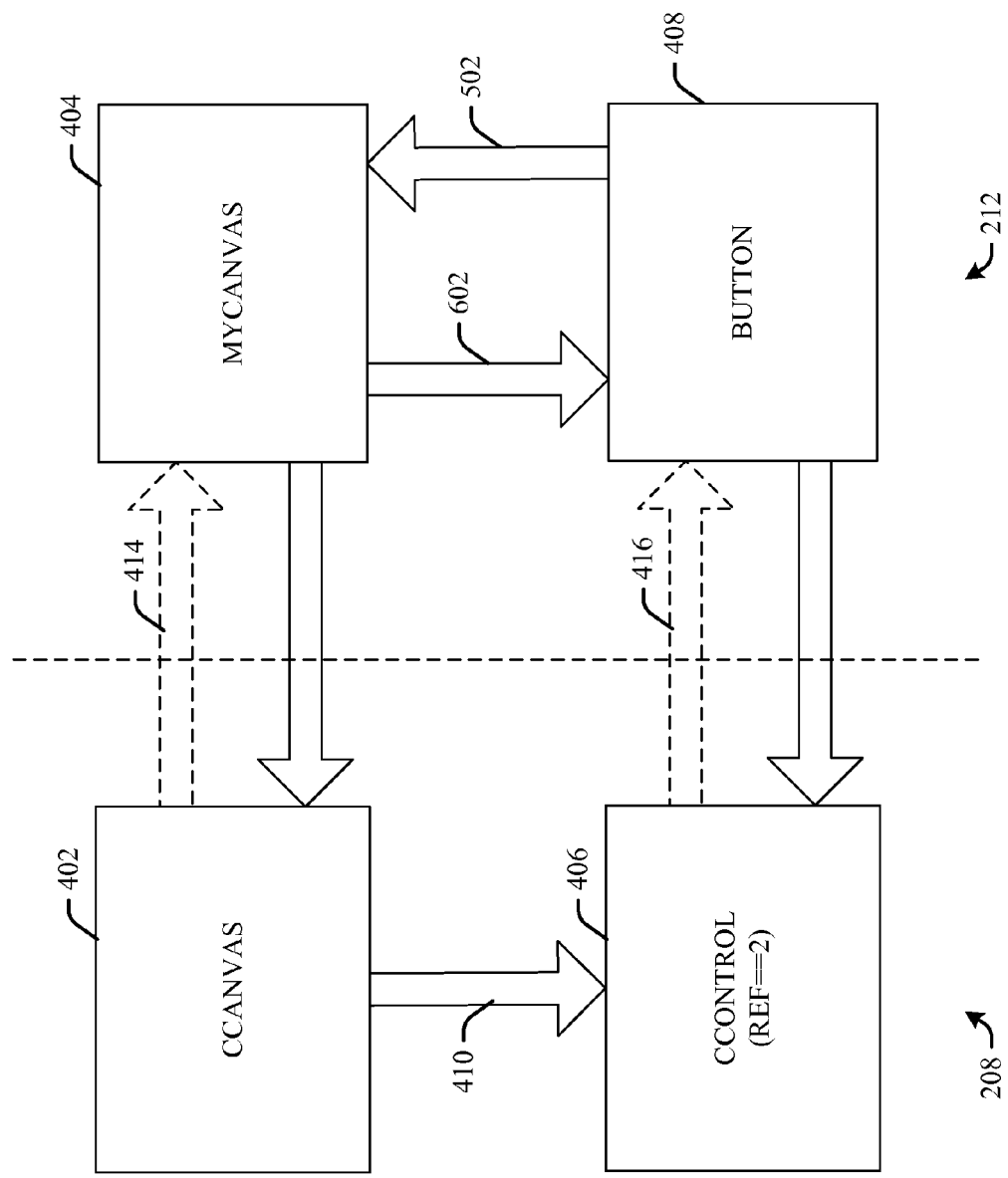

MANAGING OBJECT LIFETIME FOR NATIVE/MANAGED PEERS

TECHNICAL FIELD

The subject specification relates generally to memory management in computer systems and more particularly, to a system and methodology that facilitates automated object lifetime management.

BACKGROUND

As computer science has evolved, object oriented programming has become one of many familiar models employed by designers and programmers to implement functionality within computer systems. The object model can comprise of one or more objects that act on each other, as opposed to a traditional model that comprises of programs that are a collection of functions, or simply a list of instructions. Each object is capable of receiving messages, processing data, sending messages to other objects and can be viewed as an independent machine with a distinct role or responsibility.

The object lifetime (or life cycle) of an object, in object-oriented programming, is the time between an object's creation (also known as instantiation or construction) and an object's destruction. An object can be created and/or destroyed automatically (such as a managed object) or manually (such as a native or unmanaged object). Managed objects may be described in terms of a data type (e.g., metadata) and automatically collected (e.g., reclaimed) by a managed environment such as a garbage collector that removes the object from memory when the object is no longer being accessed. In contrast, unmanaged objects can be allocated from a standard operating system heap, wherein the object itself is responsible for freeing memory it employs when references to the object no longer exist. This can be accomplished through well-known techniques such as reference counting, for example.

As described above, managed objects can be allocated from a managed heap and automatically garbage collected. In order to achieve this, references to managed objects can be traced. When a last reference to an object is removed, the garbage collector can reclaim the memory occupied by the object, mitigating the need to reference count managed objects. Tracing is possible within managed code because the managed environment can keep track of outstanding references that exist on an object. As each new object reference is declared within managed code, the managed environment can add the reference to a list of live references. At any given time, the managed environment, rather than the object itself, can thus be aware of live references that exist on a given object. As references fall out of scope or change value, the list of live references can be updated, and as long as a reference remains within managed code, the managed environment can trace it.

The implementation of an object can be split across a native part and a managed part (peers). The native peer's lifetime can be controlled with a reference counting technique whereas the garbage collector, as discussed above, can manage the managed peer's lifetime. When some of the references between managed objects go through native code, the managed objects can be leaked or pre-maturely collected.

In multiple managed/native object pair scenarios, as long as a reference to either of the objects exists, the pair must live. Traditional solutions require multiple garbage collections to reclaim the objects and are prone to memory leaks, wherein the objects do not get collected even though there are no external references to the objects, and premature collection, wherein the garbage collector reclaims the objects even though an unmanaged reference may exist.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

The system disclosed and claimed herein, in one aspect thereof, facilitates management of the lifetime of an object. The system allows transitioning between object lifetime management systems on the native side, such as a reference counting system, and on the managed side, such as a garbage collection system. In certain phases, the system employs the reference counting system to control lifetime of an object pair whereas in other phases the system turns the lifetime control over to the garbage collection system, in a manner that is transparent to the programmer and/or end user. The system can determine lifetime of an object by dynamically switching between two lifetime management systems based on an analysis of references (direct or indirect) to the object.

According to an aspect of the system, a reference counting component employs a reference counting technique to calculate the references on each object. The reference counting component determines the total number of references on each native object peer and accordingly assigns a reference count to each native object peer. An analysis component analyzes references on a native object. In addition, the analysis component weakens and/or strengthens the references between object peers based on the analysis to avoid memory leaks. A weak reference is a reference to a managed object that does not prevent the managed object from being garbage collected such that a managed object is collectable if there are no strong references to it. Furthermore, once references are weakened, the analysis component duplicates intra native references to the managed side based on the reference analysis and prevents premature collection. The analysis component can facilitate the transitioning of lifetime management from a reference counting system to a garbage collection system and back.

According to yet another aspect of the system, when external references do not exist on the native side in multiple object pairs, the references from a native peer to a managed peer are weakened. Weakening references to managed peers within a sub tree allows the managed peers to be collected when managed references to the peers are dropped/removed. Once the references to the managed peers are weakened, the system clones the native references to the managed side and avoids premature collection. If a new external (direct and/or indirect) native reference is made to a native peer, the references to managed peers within the sub tree are made strong again.

One aspect of the system relates to an optimization component that is employed to release references between managed and native peers and/or suppress SafeHandles from finalization. Typically, a SafeHandle is a managed object that holds a reference to a native object. When managed objects are collected, a finalization mechanism is employed that performs final processing during garbage collection of a managed object. When the SafeHandle is garbage collected, its finalization step releases its reference on the native peer. The optimization component described leverages the domain specific properties of the system to derive a set of static rules for deciding when to strengthen/weaken references. Furthermore, in accordance with an aspect of the system, if a managed peer carries no state, the optimization component keeps a weak reference on it.

Yet another aspect of the system relates to a pending remove list for references that is employed to avoid race conditions. When a managed peer is garbage collected, a reference to weak reference object is kept in a pending remove list until a SafeHandle for that peer is finalized. An object can be finalized at any point in time after it has been collected. This allows the managed peer to be recreated if necessary before the finalizer has run.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

FIG. 4A-4D illustrate an exemplary garbage collection mechanism for multiple object pairs.

FIG. 5A-B illustrate an exemplary mechanism for garbage collection of multiple object pairs wherein there exists a link between managed peers of the multiple objects according to one aspect of the specification.

FIG. 6 illustrates an exemplary mechanism to avoid premature collection of objects in accordance with an aspect of the system.

DETAILED DESCRIPTION

Figure 1:
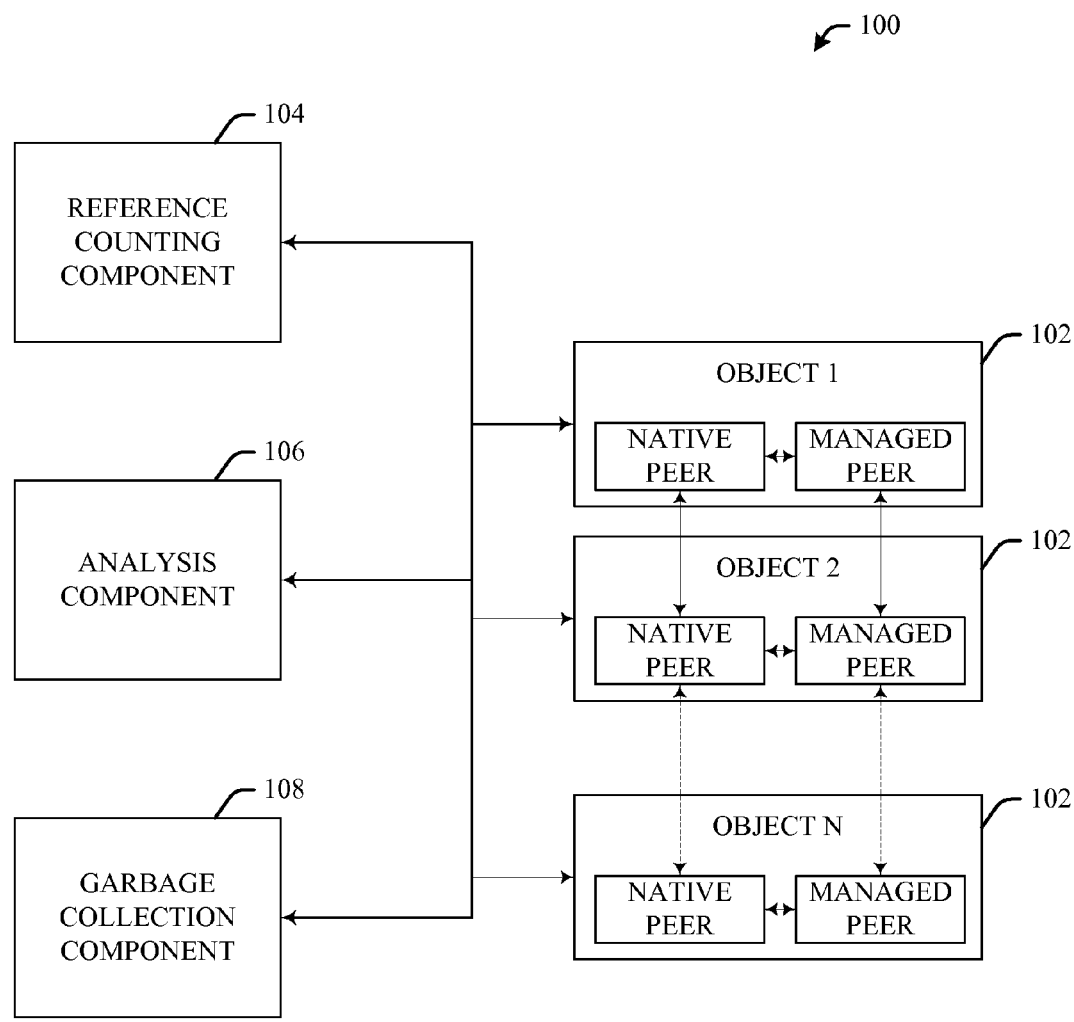
FIG. 1 illustrates a block diagram of an exemplary system that facilitates object lifetime management.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The terms "collect", "destruct", "destroy", "free" or the like, as used herein, generally refer to garbage collection of an object wherein the resources utilized by the object can be reclaimed. The resources once reclaimed can be allocated to another object.

Referring initially to the drawings, FIG. 1 illustrates an object lifetime management system 100 that controls the lifetime of objects 102. The life cycle of an object 102

(object lifetime), is the time when an object 102 is instantiated in memory until the object 102 is no longer used, and is destructed or freed. It is generally the case that after an object 102 is no longer being used, it can be removed from memory to make room for other programs or objects to take that object's place. In order to remove an object from memory, a destruction method can be called upon the unused object 102. Destroying an object 102 can cause any references (not shown in figure) to the object to become invalid. Each object 102 can have a native and managed peer (not shown) whose lifetimes can be controlled by a reference counting mechanism and a garbage collection mechanism, respectively.

The system 100 can typically include a reference counting component 104 that can employ most any reference counting technique to calculate the references on each object. The references can include external references or internal references between object peers (not shown) on an object 102. The references can also include references between multiple object pairs. The reference counting component 104 can determine the total number of references on each object 102 and accordingly assign a reference count to each object 102.

An analysis component 106 can be employed to analyze the references on an object 102. Based on the analysis, the analysis component 106 can weaken or strengthen the references between native and managed object peers. Furthermore, the analysis component 106 can also be employed to clone references between object pairs based on the analysis. The analysis component 106 can determine the transitioning of lifetime management from a reference counting system to a garbage collection system and back, based on the analysis.

The system 100 can destroy or free an unused object 102 by employing the garbage collection component 108. When an object 102 is not reachable, such that no references, direct or indirect, to the object 102 exist, the object can be collected. In a scenario wherein an object is split between a native side and a managed side, typically, the managed peer has to stay alive if there is a native reference on the native peer and the native peer has to stay alive if there is a managed reference on the managed peer. Thus, as long as there is a reference from any side, neither of the peers should be destructed. The garbage collection component 108 can determine the objects 102 to be destroyed based on the reachability information for that object 102 provided by the reference counting component 104 and the analysis component 106.

Figure 2:
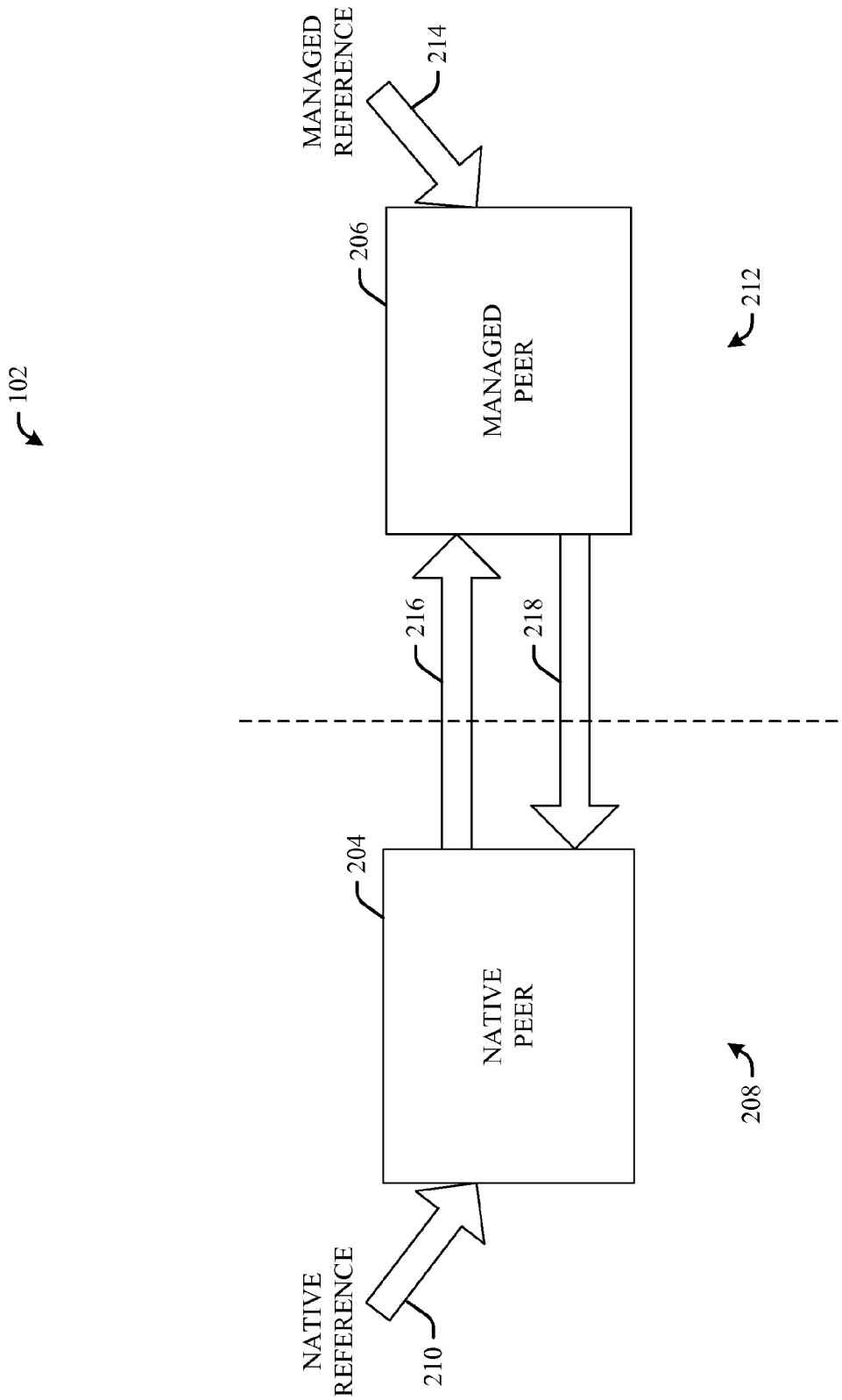
FIG. 2 illustrates an exemplary scenario wherein an object is split between a managed side and a native side according to one aspect of the specification.

FIG. 2 illustrates an object 102 in accordance with one aspect of the specification. The object 102 can be formed by two peer objects 204, 206. The native peer 204 can reside on the native side 208 and have a native reference 210 to it whereas the managed peer 206 can reside on the managed side 212 and have a managed reference 214. If the native reference 210 exists, the managed peer 206 must stay alive and similarly if the managed reference 214 exists, the native peer 204 must stay alive. Thus both peers 204, 206 need to stay alive if there is an external reference to either of them. Both the native peer 204 as well as the managed peer 206 can hold references 216, 218 to each other.

The lifetime of the managed peer can be controlled by a garbage collection mechanism. Garbage collection determines objects in a program that will not be accessed in future based on the reachability of the objects. Objects that are not reachable can be automatically destructed and the resources utilized by that object can be reclaimed. For example, memory utilized by a destructed object can now be allocated to a new object. Thus, when a managed peer 206 is not reachable from any root reference, it can be destroyed or freed. Furthermore, managed objects that have no external references besides references in a cycle can be collected. For example, if an object A has a reference to an object B, and object B has a reference to object A, but there are no other references to either objects A or B then both these objects are collectable.

A reference counting mechanism can be employed on the native side 208 to determine the lifetime of a native peer. Typically, a reference count is determined for each peer based on the number of references to the peer. A peer's reference count is incremented when a reference to it is created and decremented when a reference is destroyed. The peer's memory is reclaimed when the count reaches zero. Thus, when the native peer 204 has no references to it, it can be reclaimed.

The two lifetime management mechanisms can be dynamically coordinated to manage the lifetime of object 102 in a manner that is invisible to a user, such that memory leaks and/or premature destruction are avoided. Memory leaks occur when both the native reference 210 and managed reference 214 go away and the objects do not get collected/destructed, because they both hold references 216, 218 to each other.

Figure 3:
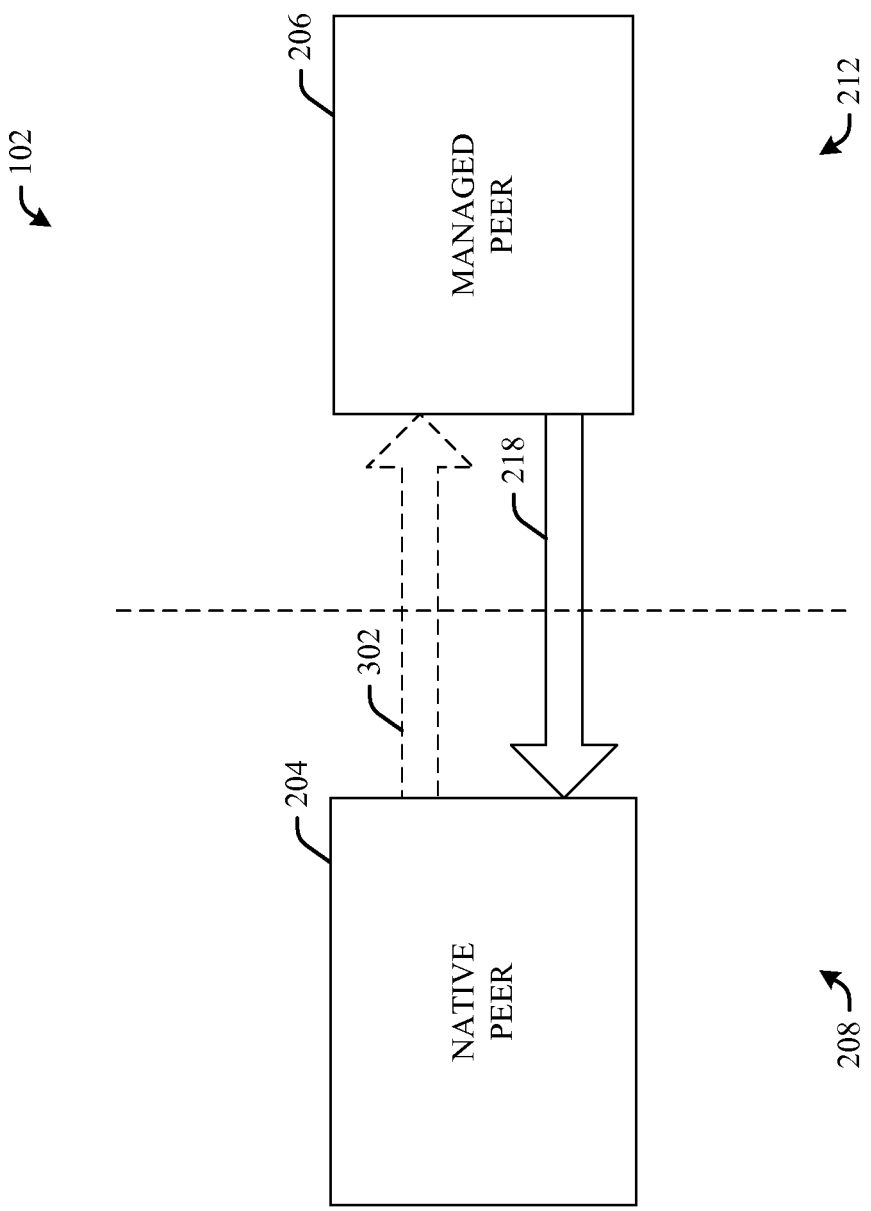
FIG. 3 illustrates an exemplary scenario wherein references to a managed peer are weakened according to an aspect of the specification.

Referring now to FIG. 3, there is illustrated an exemplary scenario wherein an object 102, that includes a native peer 204 and a managed peer 206, has no external references to either peer. The native peer 204 can reside on the native side 208 whereas the managed peer 206 can reside on the managed side 212 such that native or managed references are not made to the object 102.

If a managed peer 206 does not have any references to it, either from other managed objects or from its native peer, it can be automatically destructed. However, if the managed peer 206 that has no state on it and the only reference to it is from the native peer, is can be destructed and recreated at a later time for the same native peer 204. That is, if managed code requires a managed reference to a native object, a new managed peer can be created, as desired, for the native object. Destruction and recreation of a managed peer is possible only if the managed peer has no state on it. For example, if results of a calculation were stored on a managed object referenced by a private variable, and the managed object was then destructed, the results of the calculation would be lost if the managed object was recreated, causing an error. If the managed object does not contain application state, it can be destructed. This is possible because the system can always recreate the managed peer. This case can hold true for stateless objects but does not work for statefull objects.

Referring back to FIG. 3, the native peer 204 can hold a weak reference 302 to the managed peer 206. A weak reference can allow the system to refer to an object without keeping it from being destructed. If the garbage collector collects a weakly reachable object, the weak references to it can be set to null such that the object can no longer be accessed through the weak reference.

Holding a weak reference 302 to the managed peer 206 can provide object identity to the managed code. For example, if the user code is holding on to a reference to the managed peer 206 the weak reference can ensure that the same reference to managed peer 206 is provided to the user code when it asks for the object again. However, the weak reference can allow the managed peer 206 to be collected when no other managed references to it exist.

In the case that managed peer 206 has managed state on it, when the reference count on the native peer 204 goes to one, such that the only reference to it is 218, the reference 302 to the managed peer 206 is weakened. In such a case, the managed peer 206 can stay alive only as long as there is a managed reference to it. When the last managed reference is removed, the managed object is collected and a finalizer can perform the final release on the native peer 204. However, this mechanism to collect an object pair requires multiple garbage collections for multiple object pairs and can result in memory leaks.

Figure 4B:
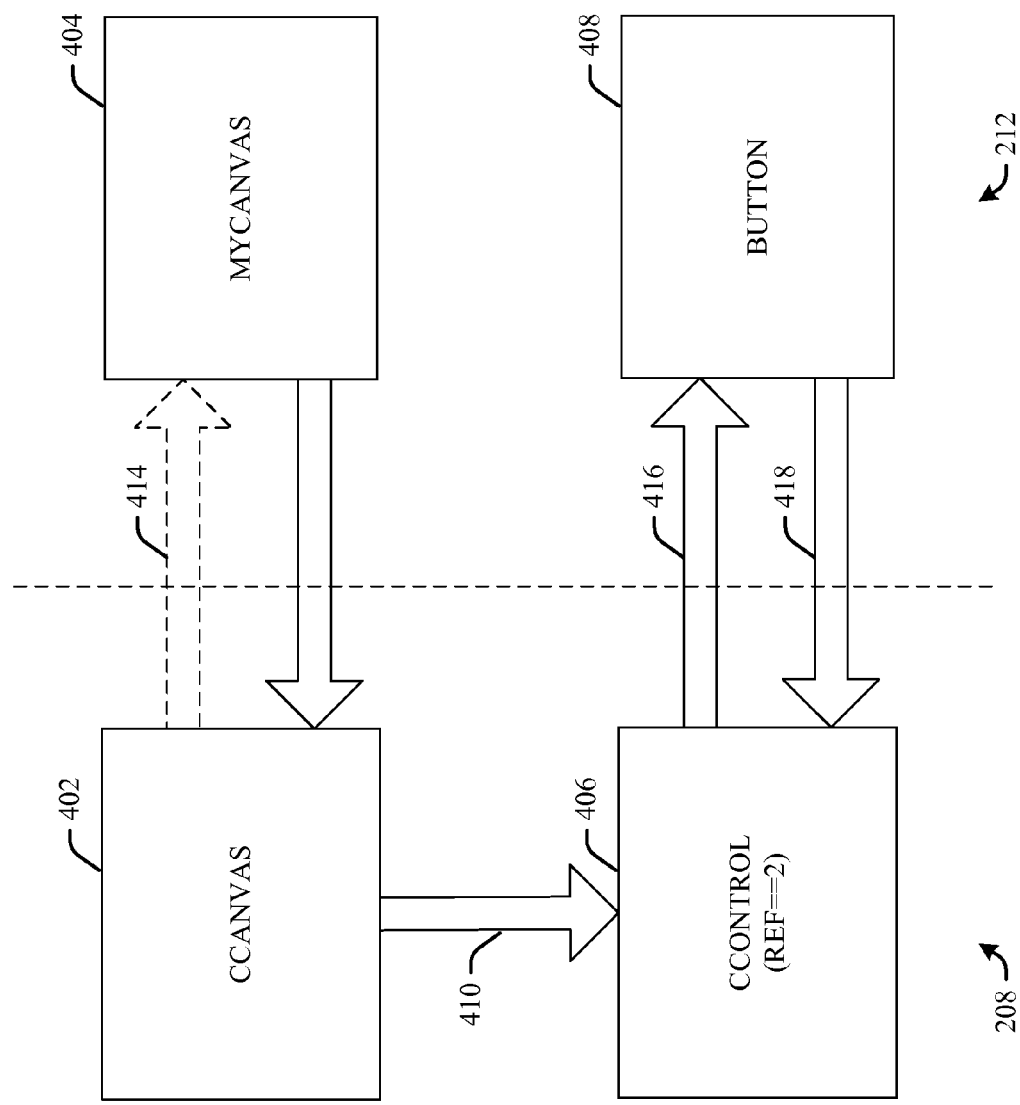

FIG. 4A-D, illustrate an exemplary destruction mechanism for multiple object pairs. Referring to FIG. 4A, there illustrated are two object pairs (402 and 404, 406 and 408) with a reference 410 between them on the native side 208, and a native reference 412 to the root. As an example, the multiple objects represent a Canvas and Button inside. It can be appreciated that the mechanism is not limited to two objects, such as the Canvas and Button, and can be applied to most any multiple object pairs.

FIG. 4B illustrates a scenario wherein the native reference 412 (FIG. 4A) to the root e.g. CCanvas 402 is removed. Since external references to the object 402 do not exist, CCanvas 402 can weaken its reference 414 to MyCanvas 404. Once the reference to MyCanvas 404 from CCanvas 402 is weakened, it can be destructed since it has no other references.

The reference count (REF) for CControl 406 is two because of a reference 410 from CCanvas 402 and another reference 418 from its managed peer 408. Thus, CControl can still hold a strong reference 416 to the Button 408. Furthermore, since the Button 408 has a strong reference 416 to it, it will not be destructed.

The managed peer MyCanvas 404 has a single weak reference 414 to it and can be destructed. When MyCanvas 404 has been destructed, a finalizer for MyCanvas (not shown) can perform the final release on the native peer 402 as shown in FIG. 4C.

Figure 4C:
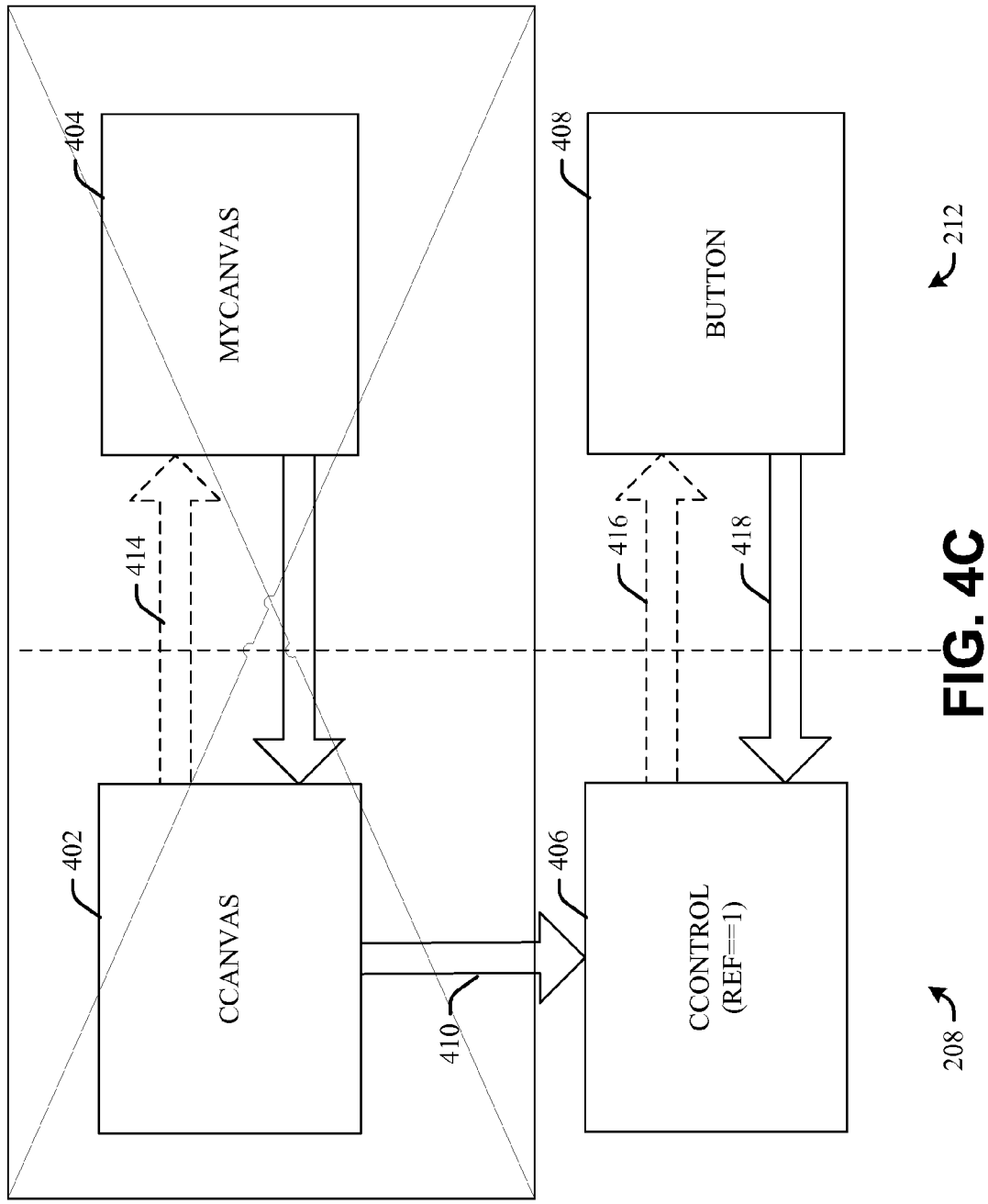

Referring to FIG. 4C, the object pair 402-404 can be destructed and the reference 410 from the CCanvas 402 to CControl 406 can be removed. Thus, the reference count of CControl can be 1 since it has only one reference 418 from its managed peer 408. As discussed above, when the native peer has no external references, it can weaken the reference to its managed peer. Thus, the reference 416 to Button 408 is weakened.

Figure 4D:
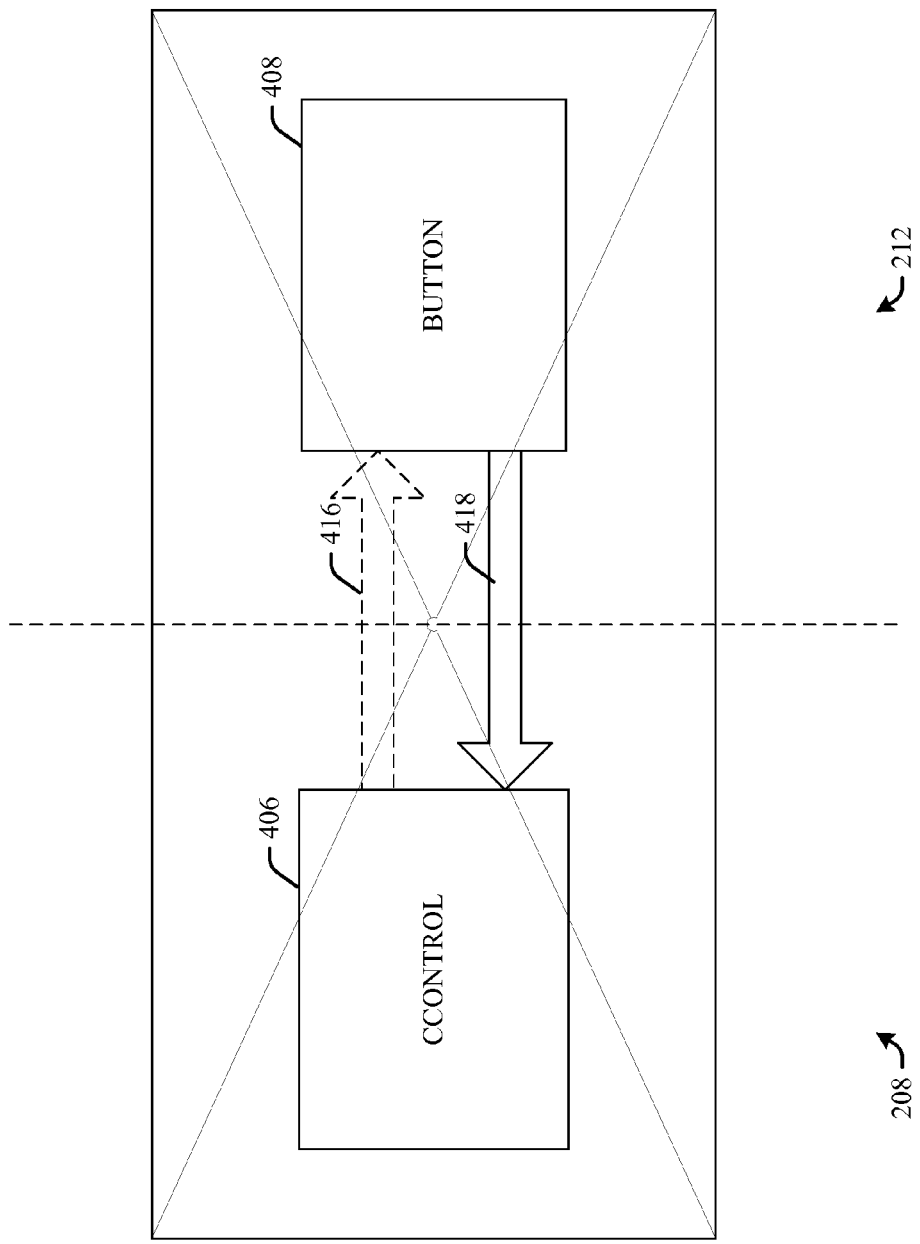

Referring now to FIG. 4D, illustrated is a managed peer Button 408 with a single weak reference 416. The Button 408 can now be destructed. When Button 408 gets destructed, a final release on the CControl 406 can be performed. As seen from FIG. 4A-D, multiple garbage collections can be required to destruct multiple pairs of objects and the number of garbage collections for a tree of object pairs depends on the depth of the tree.

Figure 5B:
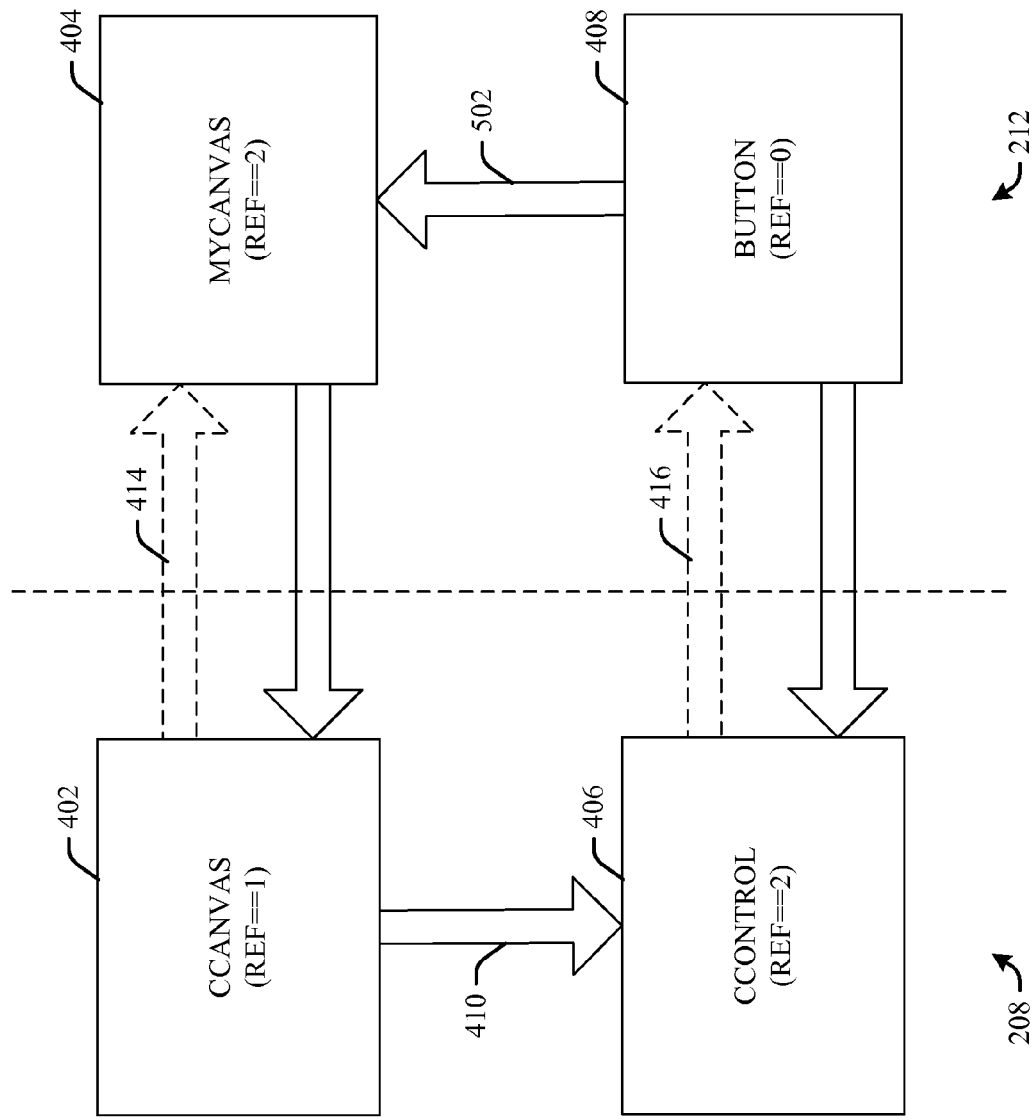

FIG. 5A-B, illustrate an exemplary mechanism for garbage collection of multiple objects wherein there exists a link between managed peers of the multiple objects. Continuing with the Canvas and Button example discussed before, a reference 502 exists from Button 408 to MyCanvas 404 on the managed side 212. Since external references do not exist, the reference count of the native peer CCanvas 402 can be one and the reference 414 can be weakened accordingly. The managed peer MyCanvas 404 has a weak reference 414 but also has a strong reference 502 from Button 408. MyCanvas 404 is reachable from a root, due to the root reference 416 that exists from CControl 406 to Button 408 and the reference 502 from Button 408 to MyCanvas 404 and thus MyCanvas 404 cannot be garbage collected. The reference count of each peer (402, 404, 406, 408) is greater than one and thus none of the peers can be garbage collected even though no external references exist to the object pairs, resulting in a memory leak.

FIG. 5B illustrates a mechanism to avoid the memory leak condition described with respect to FIG. 5A. On the last external reference to a native root, the lifetime of the objects in the tree depends on the managed references. Thus, all references to managed peers within the sub-tree can be weakened to avoid a memory leak.

As seen from FIG. 5B, external references (direct and/or indirect) do not exist on either of the native object peers 402,406. Thus, the references 414,416 to each managed peer can be weakened. Due to weakening of the reference 416, the reference count for Button 408 can reduce to zero and it can now be garbage collected. When Button 408 gets garbage collected, the reference 502 can be removed and thus MyCanvas can now be collected.

FIG. 6 illustrates a mechanism to avoid premature collection of objects with reference to the example described above. The native reference 410 can be cloned from the native side 208 to the managed side 212. The cloning of the reference avoids premature collection of the managed peer. Without the cloned reference 602, a managed reference (not shown) on the managed peer, MyCanvas 404, is unable to prevent the Button 408 from being collected.

Since there are no external references on the native side 208, the references 414 and 416 can be weakened. Furthermore, the managed peer, Button 408 can now have a cloned reference 602 from MyCanvas 404. Accordingly, in case a managed reference (not shown) exists on the managed side 212, a premature collection of the Button 408 can be avoided since Button 408 is now reachable. If a new external native reference is made to the CCanvas 402, the references 414 and 416 can be made strong again.

Figure 7:
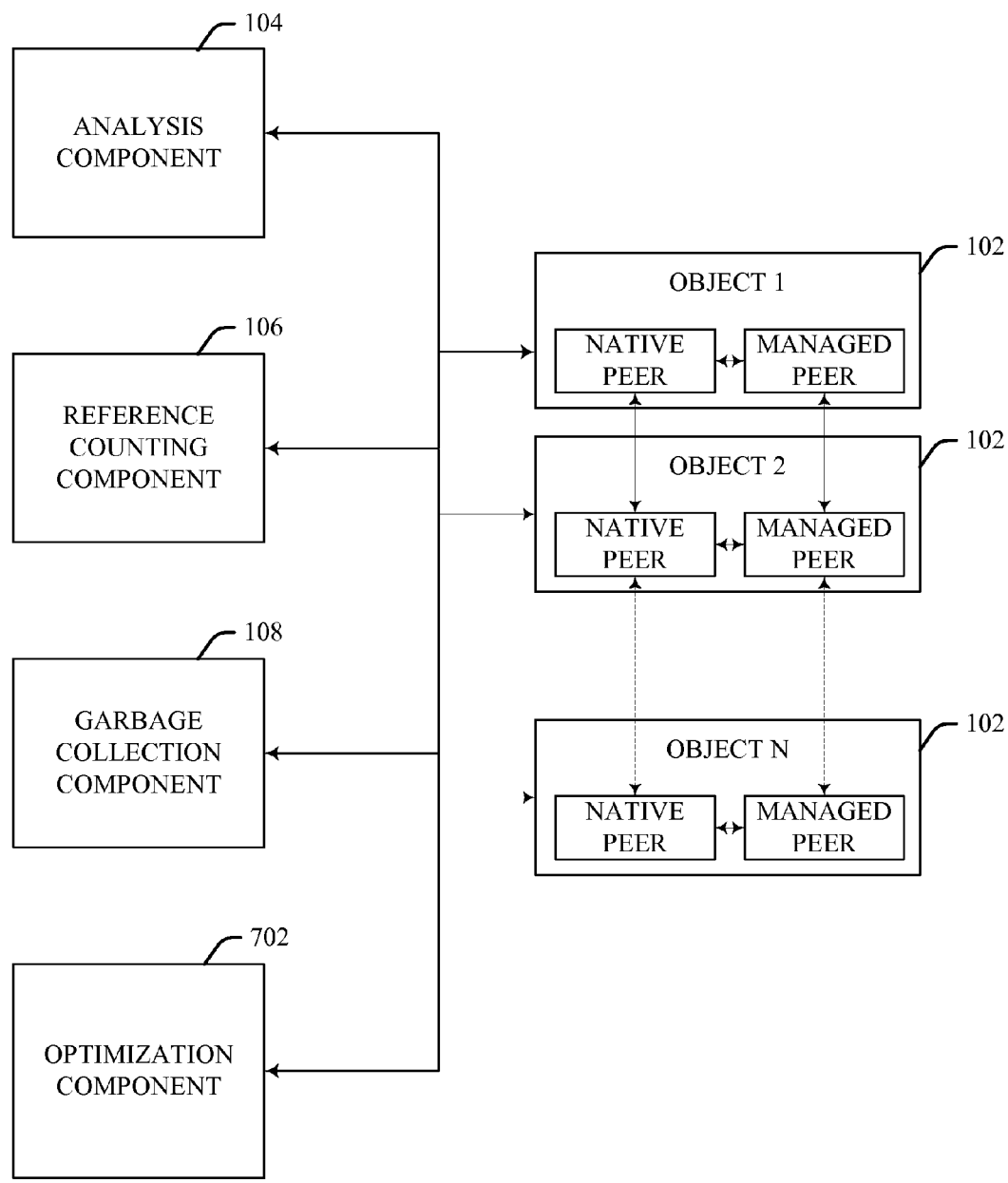
FIG. 7 illustrates a block diagram of an optimized object lifetime management system in accordance with an aspect of the system.

Referring now to FIG. 7, there illustrated is an object lifetime management system that includes an optimization component 702. The optimization component 702 can be employed to release references between managed and native peers and/or suppress SafeHandles from finalization. Typically, SafeHandles can be employed to provide critical finalization of handle resources and avoid handles from being reclaimed prematurely by garbage collection.

Figure 8A:
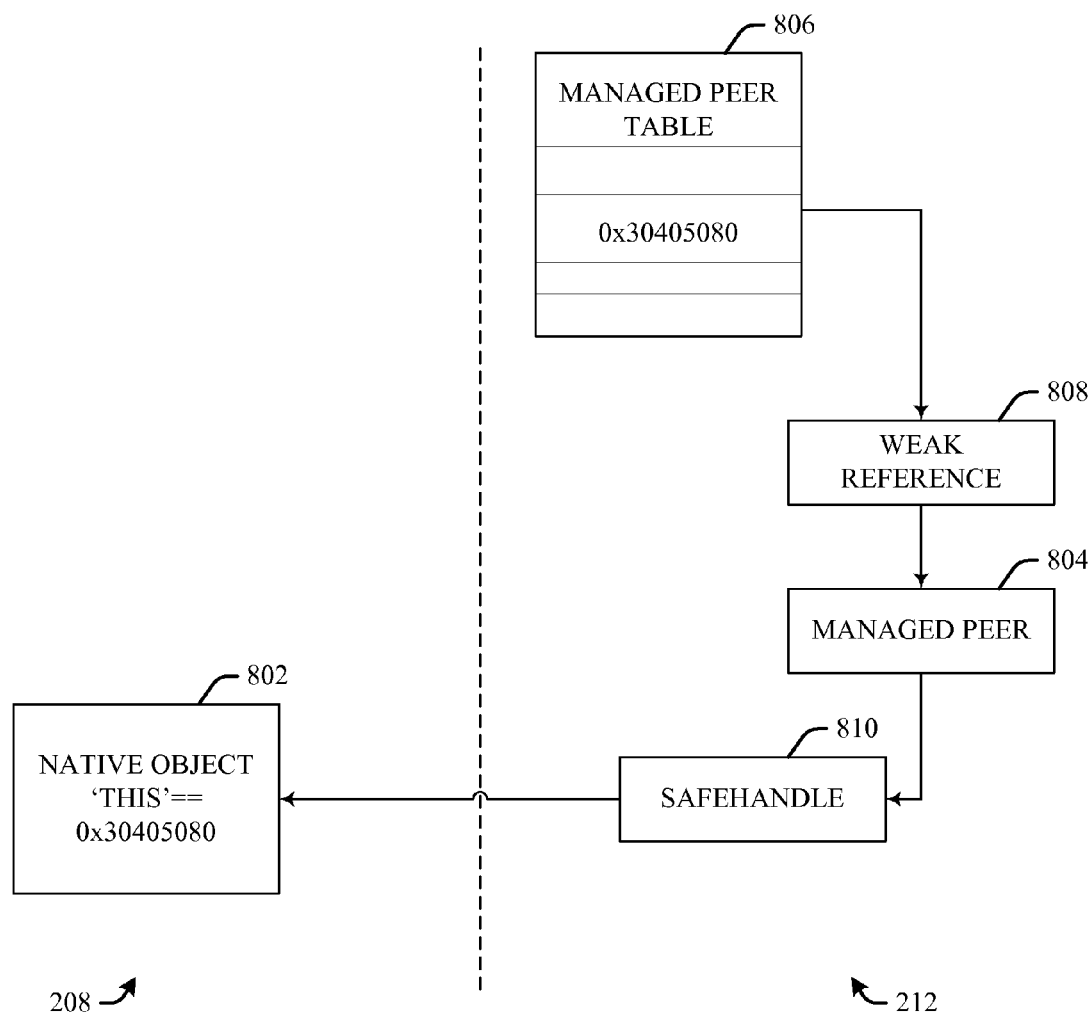
FIG. 8A-B illustrates data structures for references to a managed and native peer in accordance with an aspect of the specification.
Figure 8B:
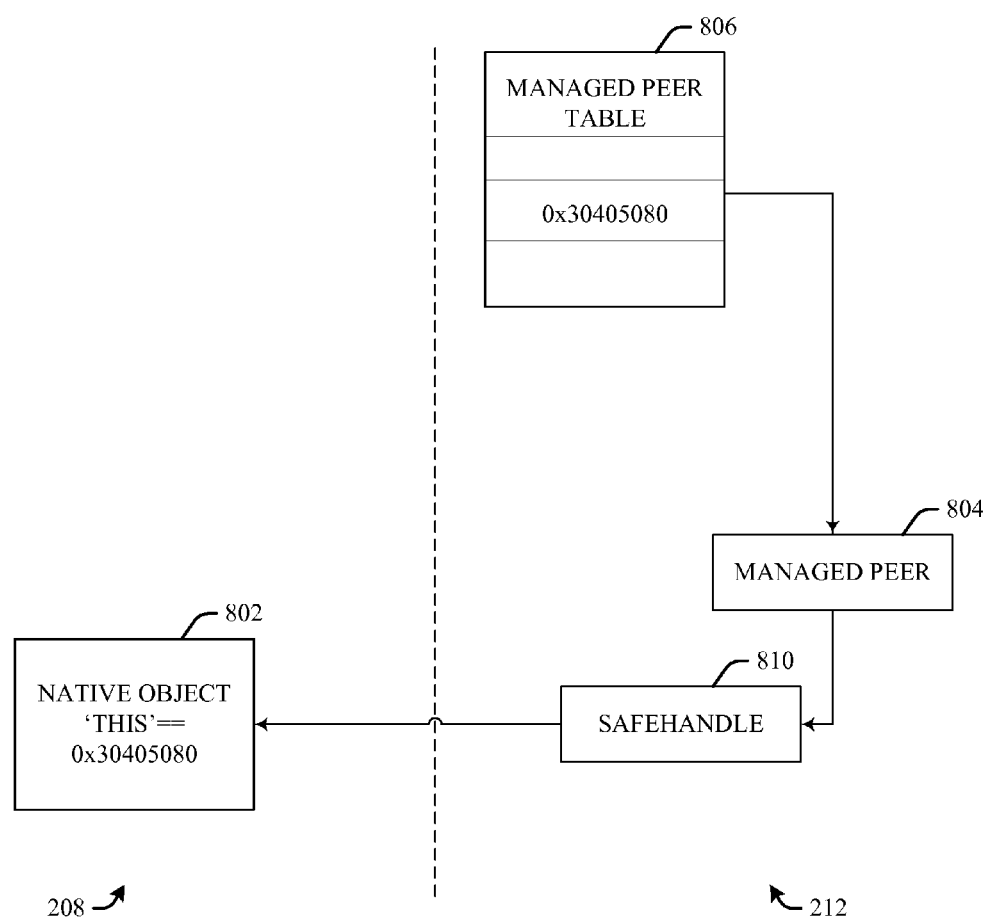

When unreachable managed objects are destructed, a finalization mechanism can be employed to performs final processing during garbage collection of the managed object. During garbage collection of the SafeHandle a finalization step releases its reference on the native peer. The optimization component 702 leverages domain specific properties of the system to derive a set of static rules for deciding when to strengthen/weaken references. Furthermore, in accordance with an aspect of the system, if a managed peer carries no state, the optimization component 702 keeps a weak reference on it FIG. 8A-B illustrates the data structures for references in accordance with an aspect of the specification. Referring initially to FIG. 8A, a data structure wherein a native object (or peer) 802 can hold a weak reference to its managed peer 804 as described supra, is illustrated. In such a case, a managed peer table (MPT) 806 references a WeakReference object 808 instead of directly referencing the managed peer 804. Furthermore, a SafeHandle 810 can have a reference counted reference on the native object 802.

If garbage collection occurs, the managed peer 804 can be collected and a finalizer thread can finalize the SafeHandle 810, which releases the native object 802. A lock can be taken on the MPT 806, and the object's entry can be removed.

Now referring to FIG. 8B, a data structure wherein a native object (or peer) 802 can hold a strong reference to its managed peer 804 is illustrated. The MPT 806 directly references the managed peer 804. Additionally, the Safe-Handle 810 can have a reference to the native object 802. During garbage collection, the managed peer 804 can be collected and a finalizer thread can finalize the SafeHandle 810, which releases the native object 802. Furthermore, a lock can be taken on the MPT 806, and the object's entry can be removed.

Figure 9:
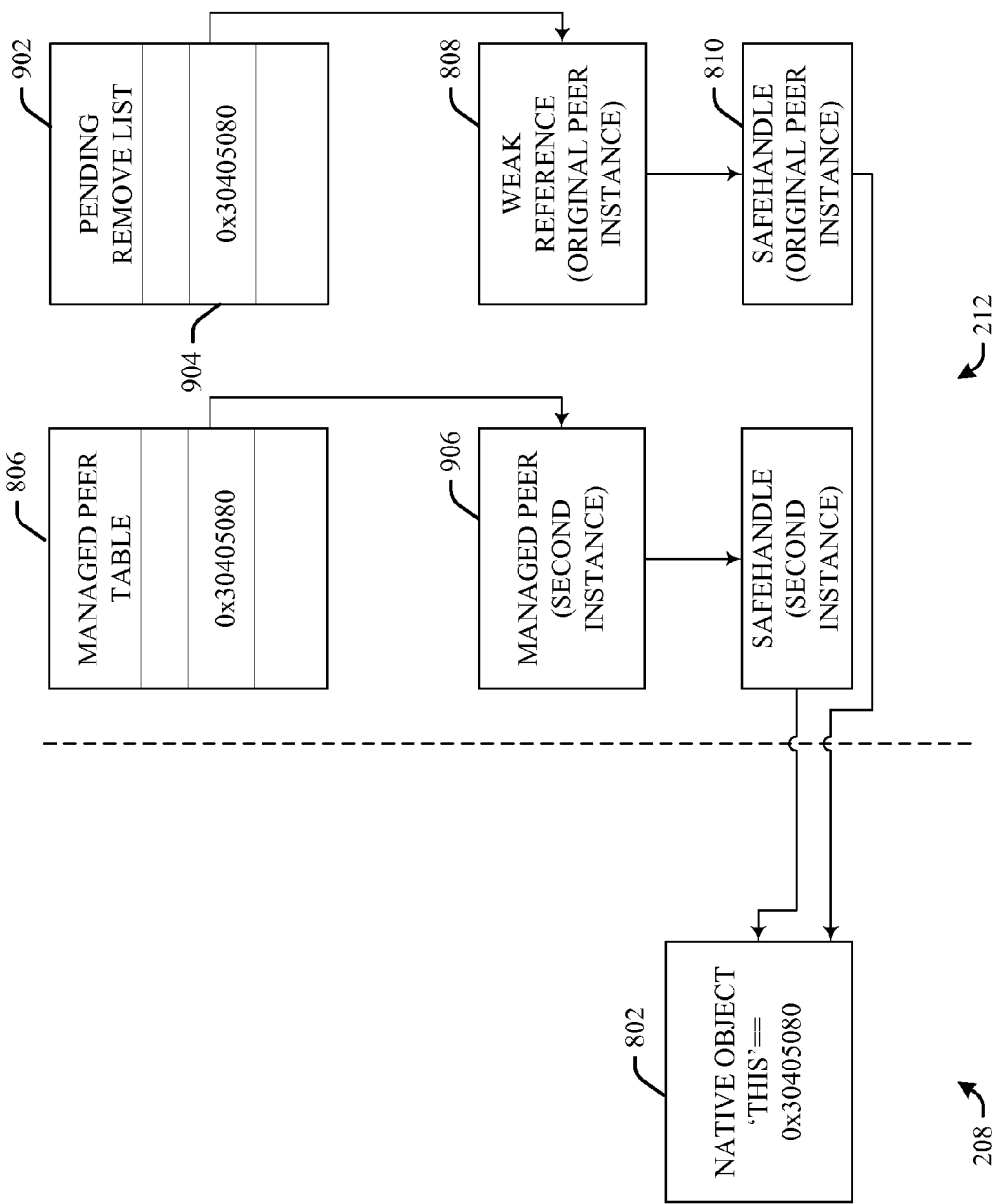
FIG. 9 illustrates data structures for references to a managed and native peer that avoid a race condition during finalization according to one aspect of the specification.

FIG. 9 illustrates a data structure for references that includes a pending remove list 902 to avoid race conditions. A race condition can occur when a weak reference is kept on the managed peer, and the managed peer may be recreated before the previous is finalized. To prevent this condition, a reference to the weak reference is kept in a second table until the SafeHandle is finalized.

When a managed peer is garbage collected, a reference 904 to WeakReference 808 can be kept in a pending remove list 902 until SafeHandle 810 is finalized. If the managed peer 906 is recreated before the SafeHandle 810 is finalized, the reference from the MPT 806 will not be removed on finalization of SafeHandle 810. When a finalizer thread finalizes the SafeHandle 810, the reference 904 in the pending remove list 902 can be removed. Thus, race condition can be avoided.

Figure 10:
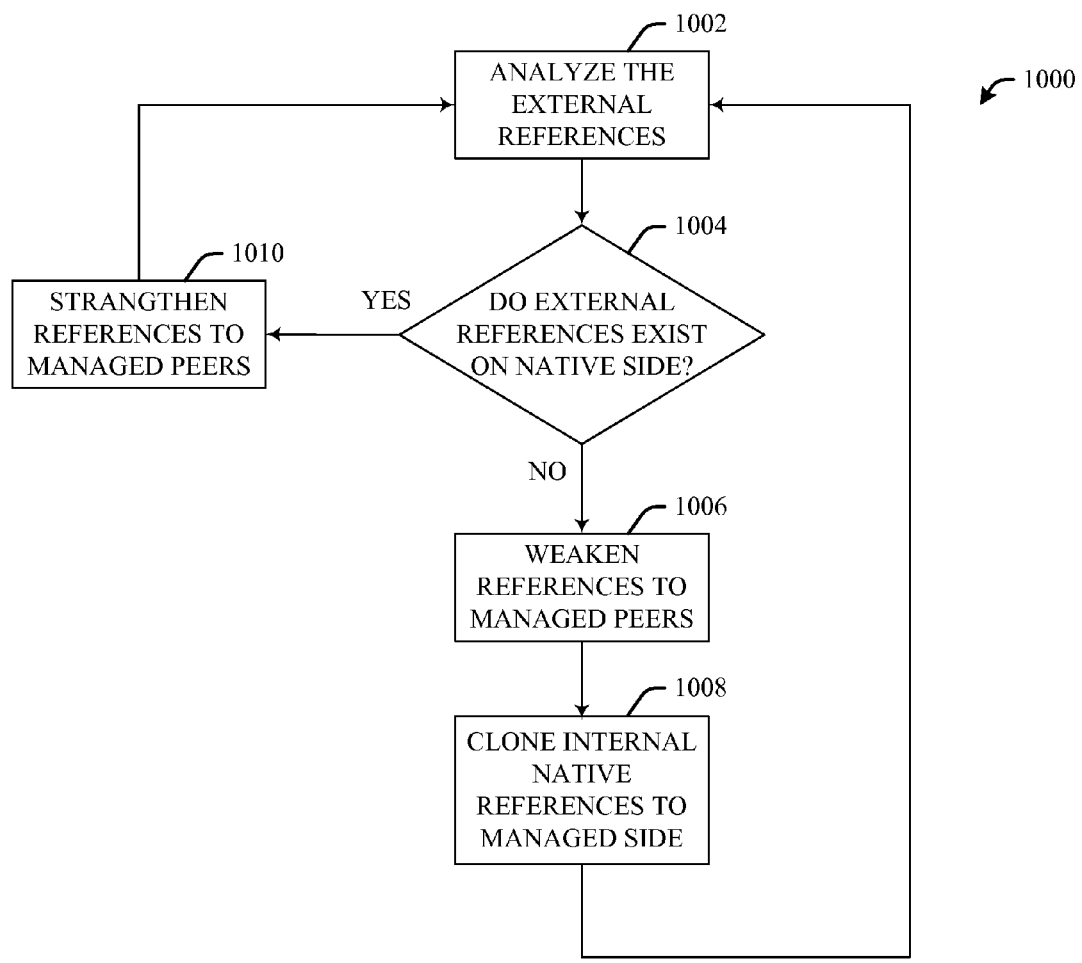
FIG. 10 illustrates an exemplary flow chart of procedures that facilitates object lifetime management and avoids memory leaks and premature collection in accordance with an aspect of the specification.

Referring now to FIG. 10, there is illustrated a methodology 1000 for managing lifetime of an object such that memory leaks and/or premature collection are prevented. The methodology can be applied to manage garbage collection of one or more object pairs. While, for purposes of simplicity of explanation, the one or more methodologies shown herein, e.g., in the form of a flow chart, are shown and described as a series of acts, it is to be understood and appreciated that the subject specification is not limited by the order of acts, as some acts may, in accordance with the specification, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the specification.

The methodology 1000 comprises analyzing the external references on one or more object pairs at 1002. It can be determined if external references exist on the native side, as shown by decision box 1004. If there are no external references to the native peers, the references to their managed peer can be weakened at 1006. The weakening of referenced to the managed side can avoid memory leaks. Furthermore, internal references between native peers can be cloned to the managed side, at 1008, such that the managed peers hold a strong reference between them. The cloning of references to the managed side prevents premature collection of the objects. Additionally, if it is determined that external references do exist on the native side, the references to the managed peers from the native peers can be strengthened, as shown at 1010.

Figure 11:
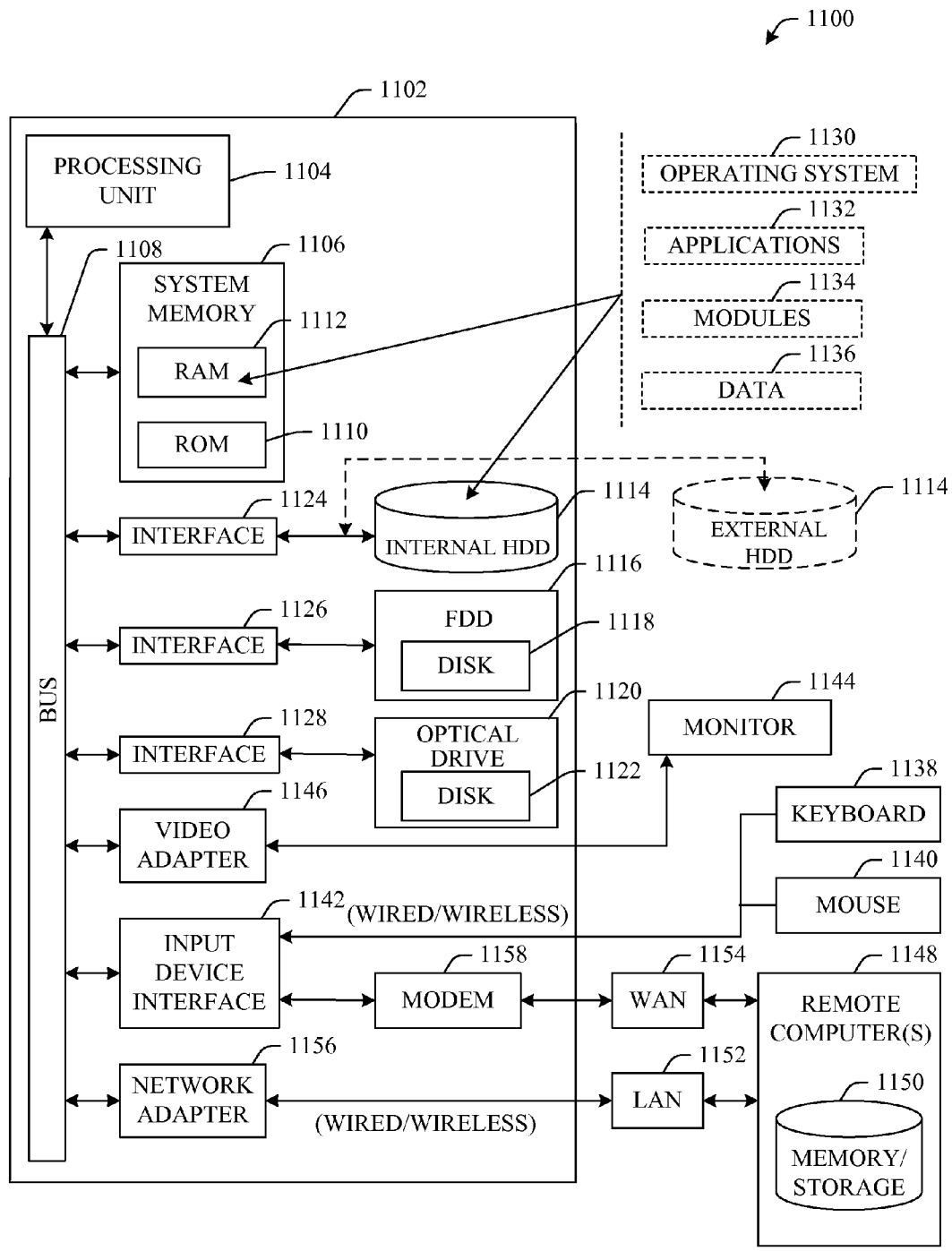
FIG. 11 illustrates a block diagram of a computer operable to execute the disclosed architecture.

Referring now to FIG. 11, there is illustrated a block diagram of a computer operable to execute the disclosed architecture. In order to provide additional context for various aspects of the subject specification, FIG. 11 and the following discussion are intended to provide a brief, general description of a suitable computing environment 1100 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the example environment 1100 for implementing various aspects of the specification includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1194 interface technologies. Other external drive connection technologies are within contemplation of the subject specification.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the specification can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1194 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are example and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented object lifetime management system, comprising:
 a processor; and
 a computer-readable storage device storing instructions that, when executed by the processor, cause the processor to implement a reference counting component, an analysis component, and a garbage collection component;
  the reference counting component configured to determine a reference count for one or more objects;
  the analysis component configured to dynamically transition the one or more objects between a native object lifetime management system, which utilizes a reference counting component to determine a lifetime of one or more native object peers and a managed object lifetime management system, which utilizes a garbage collection component to control a lifetime of one or more managed object peers, the analysis component further configured to at least one of
   modify a strength of a reference by weakening or strengthening the reference from a native object peer to a managed object peer based on the analysis of the references on the one or more objects, or
   duplicate at least one reference between multiple native object peers on the native object lifetime management system to the managed object lifetime management system; and
  the garbage collection component configured to reclaim resources utilized by the managed object peers based on information provided by the reference counting component and by the analysis component.

2. The computer-implemented system of claim 1, wherein the analysis component is configured to analyze external references to the native object peer.

3. The computer-implemented system of claim 2, wherein the analysis component is configured to weaken the reference from the native object peer to the managed object peer when external references to the native object peer do not exist, wherein at least one of the external references is at least one of a direct reference or an indirect reference.

4. The computer-implemented system of claim 2, wherein the analysis component is configured to strengthen the reference from the native object peer to the managed object peer when at least one of a direct reference or an indirect reference is made to the native object peer, wherein the direct reference and the indirect reference are external references.

5. The computer-implemented system of claim 1, further comprising an optimization component configured to release references between managed object peers and native object peers during shutdown of an object system.

6. The computer-implemented system of claim 1, further comprising an optimization component configured to suppress at least one managed object peer that holds the reference to the native object peer from finalization during shutdown of an object system.

7. A computer-readable storage device storing computer-executable instructions that, when executed by a processor, cause the processor to:
 analyze references on one or more objects;
 automatically transition the one or more objects between a native object lifetime management system, which utilizes a reference counting mechanism to determine a lifetime of one or more native object peers, and a managed object lifetime management system, which utilizes a garbage collection mechanism to control a lifetime of one or more managed object peers, based on the analysis of the references on the one or more objects;
 perform at least one of modify a strength of a reference by weakening or strengthening the reference from a native object peer to a managed object peer based on the analysis of the references on the one or more objects or duplicate at least one reference between multiple native object peers on the native object lifetime management system to the managed object lifetime management system; and
 employ at least one of the native object lifetime management system or the managed object lifetime management system to destroy an unused object.

8. The computer-readable storage device of claim 7, further storing computer-executable instructions that, when executed by a processor, cause the processor to:
 determine at least one of a direct reference, or an indirect reference, on the one or more objects, wherein the direct reference and the indirect reference are external references.

9. The computer-readable storage device of claim 8, further storing computer-executable instructions that, when executed by a processor, cause the processor to:
 perform the duplicating at least one reference based on the analysis of the references on the one or more objects.

10. The computer-readable storage device of claim 8, further storing computer-executable instructions that, when executed by a processor, cause the processor to:
 weaken the reference when external references to the native object peer do not exist.

11. The computer-readable storage device of claim 9, wherein the analysis is an analysis of the external references to a native object.

12. The computer-readable storage device of claim 7, further storing computer-executable instructions that, when executed by a processor, cause the processor to:
 release references between the managed object peer and the native object, of the one or more objects, during object system shutdown.

13. The computer-readable storage device of claim 7, further storing computer-executable instructions that, when executed by a processor, cause the processor to:
 suppress, from finalization during object system shutdown, the managed object peer that holds the reference to the native object.

14. A computer-implemented method to dynamically transition between a native object lifetime management system and a managed object lifetime management system, wherein the dynamic transitioning reduces a likelihood of at least one of memory leaks or premature destruction of a managed object peer, the computer-implemented method comprising:

executing on a processor, computer-executable instructions that, when executed, cause the processor to perform:
   analyzing references on one or more native object peers;
   dynamically transitioning the one or more native object peers between a native object lifetime management system, which utilizes a reference counting mechanism to determine a lifetime of one or more native object peers, and a managed object lifetime management system, which utilizes a garbage collection mechanism to control a lifetime of one or more managed object peers, based on the analysis;
   performing at least one of modifying a strength of a reference by weakening or strengthening the reference from a native object peer to a managed object peer based on said analyzing or duplicating at least one reference between multiple native object peers on the native object lifetime management system to the managed object lifetime management system; and
   employing at least one of the native object lifetime management system or the managed object lifetime management system to reclaim resources utilized by an unused object.

15. The computer-implemented method of claim 14, wherein said strengthening comprises strengthening the reference from the native object peer to the managed object peer when at least one of a direct reference or an indirect reference is made to the native object peer, wherein the direct reference and the indirect reference are external references; and wherein said weakening comprises weakening a reference from the native object peer to the managed object peer when external references to the native object peer do not exist.

16. The computer-implemented method of claim 14, wherein said duplicating is based on the analysis.

17. The computer-implemented method of claim 14, further comprising optimizing object system shutdown by releasing references between managed object peers and the one or more native object peers.

18. A computer-readable storage device having stored thereon computer-executable instructions that, when executed, cause a processor to perform the computer-implemented method of claim 14.

19. The system of claim 1, further comprising a storage component configured to store a pending list that includes a reference to a weak reference on a managed object peer to avoid a race condition during finalization.

20. The system of claim 19, wherein the race condition occurs when the managed object peer is recreated at the same time as the managed object peer is finalized.

* * * * *